R. ELLIS & B. F. LINDSEY.
Ditching-Machines.

No. 147,622.

Patented Feb. 17, 1874.

Witnesses.

Inventors
Roswell Ellis and
Benjamin F. Lindsey
By J. M. Perkins, Attorney

UNITED STATES PATENT OFFICE.

ROSWELL ELLIS AND BENJAMIN F. LINDSEY, OF ONARGA, ILLINOIS.

IMPROVEMENT IN DITCHING-MACHINES.

Specification forming part of Letters Patent No. 147,622, dated February 17, 1874; application filed October 8, 1873.

*To all whom it may concern:*

Be it known that we, ROSWELL ELLIS and BENJAMIN F. LINDSEY, of Onarga, in the county of Iroquois and State of Illinois, have invented certain new and useful Improvements in Ditchers and Graders; and we hereby declare the following to be a full, clear, and exact description thereof, reference being had to the accompanying drawing, and to the letters of reference marked thereon.

The nature of our invention consists in the hereinafter-described means for securing to the revolving table a steady and uniform motion, thereby allowing the dirt to be carried from the ditch to the opposite side and there deposited.

In order to enable others skilled in the art to which our invention appertains to make and use the same, we will now proceed to describe its construction and operation, referring to the annexed drawing, which forms a part of this specification, and in which—

Figure 1:
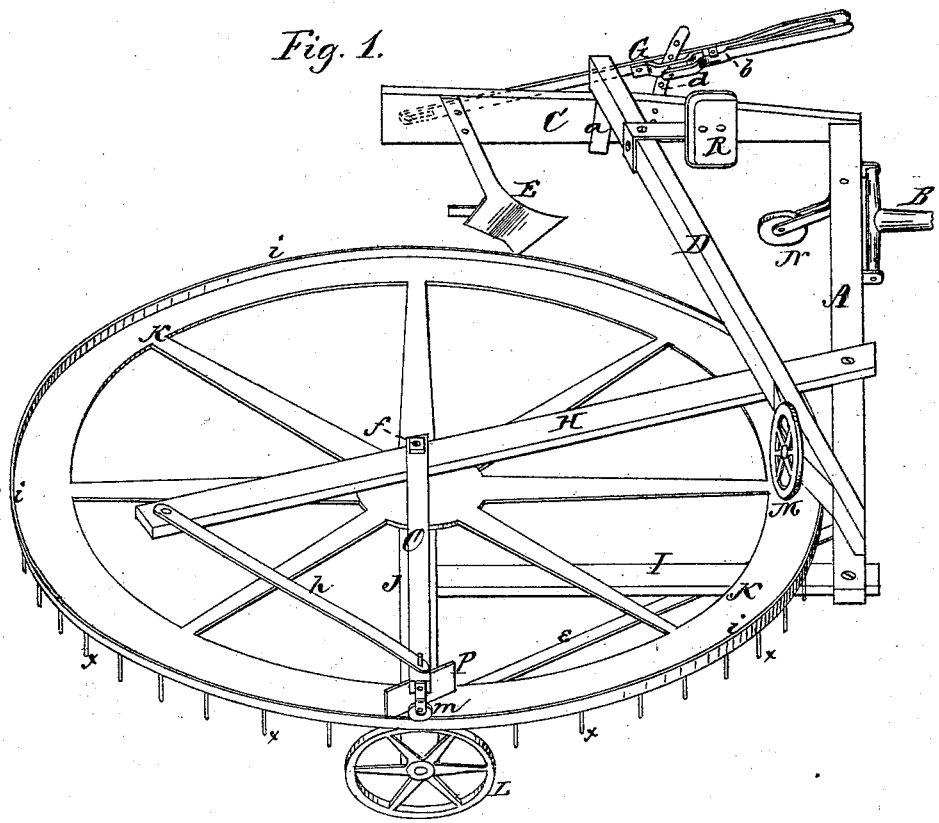
Figure 2:
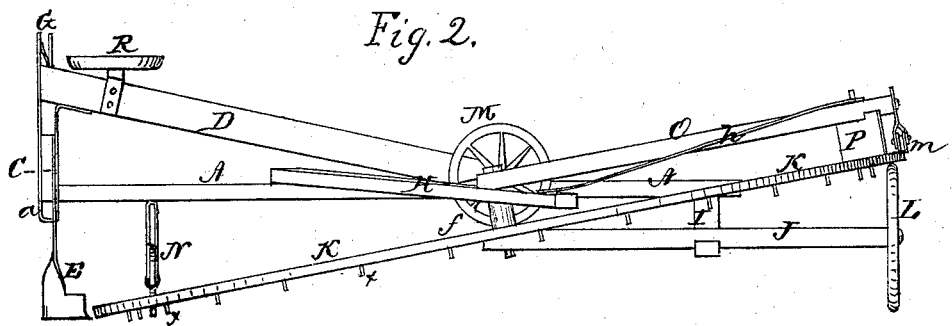

Figure 1 is a perspective view, and Fig. 2 a rear elevation, of our machine.

A represents a straight bar, to the front side of which, near the left end, is attached the tongue B. To the left end of the bar A is pivoted a bar, C, which extends at right angles toward the rear, and passes through a metal loop, a, attached to the end of a diagonal beam, D. To the inner side of the bar C is attached the ditching-plow E, which is raised and lowered at pleasure, to dig the ditch any desired depth, by means of a lever, G, pivoted to the outside of the loop a. The rear end of this lever is slotted, and passes over a pin in the bar C, while the front end is provided with a spring-catch, b, to catch in a perforated standard, d, attached to the bar C. By this means the plow E may be raised and lowered at will, and held at any desired point, as desired. The right end of the beam D is firmly secured on the bar A at or near its right end, and is supported upon and attached to another beam, H, the front end of which is secured on the bar A at or near the center, and extends backward and toward the right. From the right end of the bar A another bar, I, extends at right angles toward the rear, and at the rear end of said bar I is attached a bar, J, running parallel with the front bar A. e is a brace, connecting the outer end of the bar J with the bars I and A. Through the inner end of the bar J, and through the beam H, passes a short shaft or spindle, f, upon which, between said bar and beam, is placed a circular revolving table, K. This table consists simply of a hub with a series of radiating arms supporting a rim of suitable width, and around the outer edge of the same is an upward-projecting flange, i, to keep the dirt on the rim, and prevent it from falling off. Upon the outer end of the bar J is mounted a wheel, L, which runs on the ground, and supports the right side of the wheel K, elevating the same, so that the left side of the wheel will be pressed down hard on the ground. The under side of the wheel K is provided with a series of pins or teeth, x x, which enter the ground at the left side of the wheel, and as the machine is moved forward causes the wheel to revolve. On the back of the bar D is mounted another wheel, M, which runs on top of the wheel K, and presses down the left side thereof. N represents a caster-wheel arranged under the left end of the bar A, in rear of the tongue B, to support that side of the machine. From the top of the beam H, at the spindle f, a bar, O, extends toward the right above the wheel K, and parallel with the bars A and J, and said bar O is braced by a brace, h, as shown. At the outer end of the bar O is attached a roller, m, which is grooved circumferentially, and runs on the flange i of the wheel K. This wheel m is the important feature in our invention, as it serves, in connection with wheel L, to steady the revolving table, preventing its tipping, and giving it that uniform motion that will retain the dirt on the table until displaced by the scraper. Immediately inside of this roller, to the bar O is attached a scraper, P, to remove the dirt from the wheel. R represents the driver's seat, arranged upon and near the left end of the bar D.

The operation of our machine is briefly described as follows: The plow E having been set to the desired depth, the machine is moved forward, and the dirt is thrown up by the plow on the wheel or table K at the left side. This table, by means of the pins x x, revolves, carrying the dirt backward and around to the right side, where it is scraped off by the scraper P.

We are aware that machines of this class, having the revolving table, plow, carrying-wheels, and adjusting means, have been known before. These features, therefore, we do not claim; but What we do claim is—

The revolving table K, provided with circumferential flange i and pins x x, wheel M, and wheel L, in combination with scraper P and steadying-roller m, as shown and specified.

In testimony that we claim the foregoing we have hereunto set our hands this 11th day of September, 1873.

ROSWELL ELLIS.
BENJAMIN F. LINDSEY.

In presence of—
MICHAEL LOVETT,
JOHN WELLS.